(12) United States Patent
Mendoza et al.

(10) Patent No.: US 6,250,195 B1
(45) Date of Patent: Jun. 26, 2001

(54) COMPACT UNIVERSAL EJECTION/RAIL LAUNCHING SYSTEM

(75) Inventors: Jeffrey R. Mendoza, Gardena; Herman G. Streiff, Northridge; David H. Graham, San Pedro, all of CA (US)

(73) Assignee: Northrop Grumman Corporation, Los Anglels, CA (US)

(*) Notice: Subject to any disclaimer, the term of this patent is extended or adjusted under 35 U.S.C. 154(b) by 0 days.

(21) Appl. No.: 09/437,768

(22) Filed: Nov. 9, 1999

(51) Int. Cl.$^7$ .......................................................... B64D 1/04
(52) U.S. Cl. .............................. 89/1.59; 89/1.54; 89/1.51; 244/137.4
(58) Field of Search ..................................... 89/1.54, 1.51, 89/1.59; 244/137.4, 137; 294/82.26

(56) References Cited

U.S. PATENT DOCUMENTS

| | | | |
|---|---|---|---|
| 2,069,996 | * | 2/1937 | Carleton et al. . |
| 2,958,260 | * | 11/1960 | Anderson . |
| 3,008,376 | * | 11/1961 | Brunow et al. . |
| 3,056,623 | * | 10/1962 | Herbert . |
| 3,273,459 | * | 9/1966 | Lardin . |
| 4,008,645 | * | 2/1977 | Herbert . |
| 4,440,365 | * | 4/1984 | Holtrop . |
| 4,600,171 | * | 7/1986 | Kalisz . |
| 4,606,517 | * | 8/1986 | Adams . |
| 4,616,793 | * | 10/1986 | Hassler, Jr. . |
| 4,632,338 | * | 12/1986 | Hasquenoph et al. . |
| 4,669,356 | * | 6/1987 | Griffin et al. . |
| 4,679,751 | * | 7/1987 | Peterson . |
| 4,685,377 | * | 8/1987 | Mace et al. . |
| 4,730,535 | * | 3/1988 | Steinmetz . |
| 4,829,878 | * | 5/1989 | Thompson . |
| 5,092,542 | * | 3/1992 | Ellis et al. . |

* cited by examiner

Primary Examiner—Charles T. Jordan
Assistant Examiner—Troy Chambers
(74) Attorney, Agent, or Firm—Terry J. Anderson; Karl J. Hoch, Jr.

(57) ABSTRACT

A compact universal apparatus which is mountable within an optimally sized weapons bay of a conventional fighter aircraft, which includes an automatic scissors or trapeze type lowering linkage mechanism for a conventional or inventory bomb ejector rack unit (BRU) having automatic latching, release and forced ejection mechanisms for conventional inventory weapons, characterized by an adaptor designed for the fixed attachment of the bomb ejector rack unit to the linkage of the lowering mechanism of the apparatus. The ejector rack unit is one adapted to the forced ejection of large bombs, attached or latched directly thereto, and to the rail launching of missiles having launching rails attached or latched directly to the ejector rack unit, with conventional automatic latch up of the bail lugs of the bombs to the launch rack lugs of the ejector rack unit, for forced ejection of the bombs, and with conventional automatic latch up of launch rails of conventional missiles for rail launching of the missiles.

5 Claims, 3 Drawing Sheets

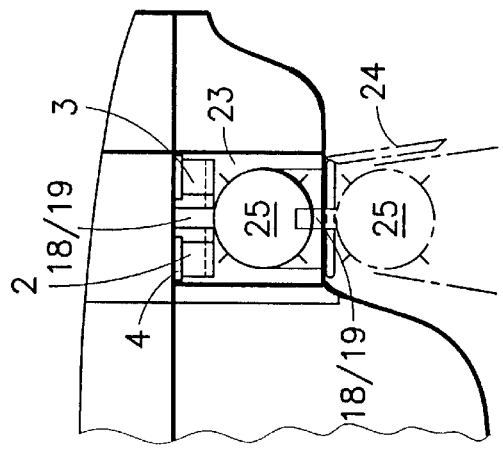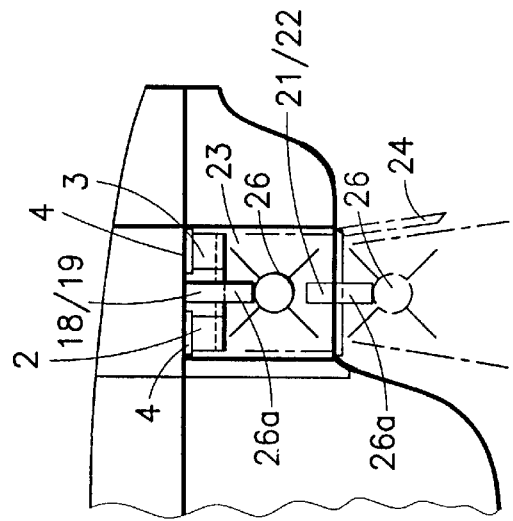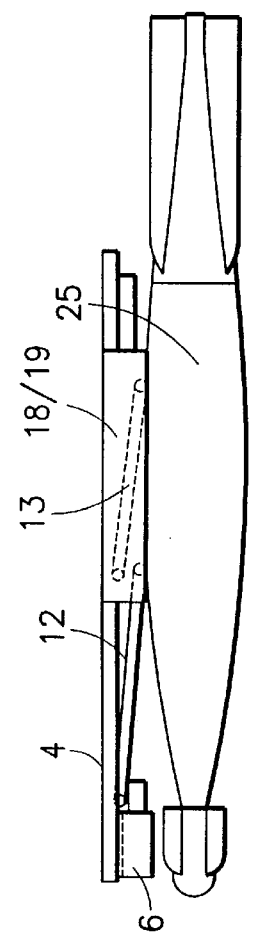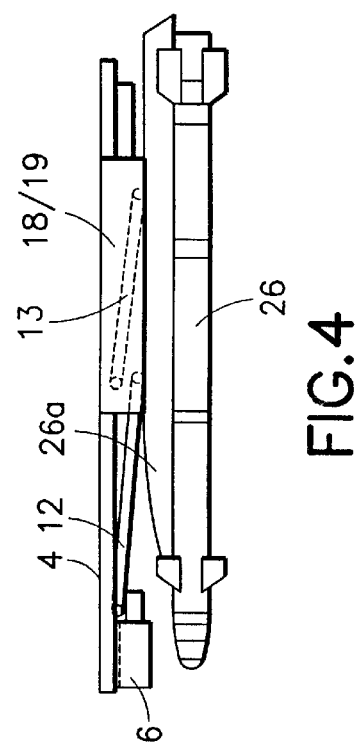

COMPACT UNIVERSAL EJECTION/RAIL LAUNCHING SYSTEM

BACKGROUND OF THE INVENTION

1. Field of the Invention

The present invention relates to a compact, universal apparatus for supporting, lowering and launching either strike weapons or air combat weapons from within optimally sized weapons bays of advanced low signature fighter aircraft.

It is highly advantageous, particularly under combat conditions, to provide fighter aircraft with a means for supporting either strike weapons, such as large 2000 lb bombs of the GBU and JDAM classes for forced ejection therefrom, or air combat weapons or missiles such as "lock on after launch" (LOAL) air to air weapons such as ALM-20 missiles and "lock on before launch" (LOBL) weapons such as ALM-9 and AGM-65 Maverick missiles for rail launching therefrom.

It is also highly advantageous that such a support system be universal, to accommodate the simple latch up of inventory bail lug strike weapons such as 2000 lb class smart bombs, and be easily and rapidly modified with simple latch means to accommodate LOBL and LOAL rail launch weapons, and for the rapid conversion of the support, lowering and launching apparatus to alternatively employ forced ejection bombs and air combat weapons under combat conditions.

2. State of the Art

It is known to provide aircraft with means for supporting either strike or air combat weapons within weapons bays, and means for lowering such weapons out of weapons bays and for launching either type of such weapons while supported below the aircraft for safety purposes. However, such known systems generally are complex, difficult to load with the weapons, do not accommodate both strike weapons such as smart bombs and air combat weapons such as missiles within optimally sized weapons bays, or do not accommodate the conventional latch mechanisms of inventory bail lug strike weapons.

Reference is made to U.S. Pat. No. 4,697,764 for its disclosure of a reconfigured bay housing having folding doors which divide the housing into individual compartments for supporting, lowering and launching a variety of different LOAL and LOBL missiles as well as air-to-ground bombs from advanced low signature aircraft. The reconfigured bay housing of the aircraft includes linkage launchers, attached to the housing, for extending or lowering the weapons from the housing for launch. The linkage launchers can be attached to adaptors which are attached to missiles, or are attached to launch rails which are attached to missiles for rail launching. The reconfigured bay housing requires extensive modification of the optimally sized weapons bays present on conventional fighter aircraft, and the support, lowering and ejection apparatus does not accommodate the use of conventional BRU ejector racks which have latch up mechanism for receiving the bail lugs of conventional inventory strike weapons such as 2000 lb smart bombs, and for the forced ejection of such weapons therefrom.

Reference is also made to U.S. Pat. No. 3,611,865 for its disclosure of a bomb ejector rack having standard aircraft armament characteristics, as used as a component of the present apparatus for the automatic latching and forced ejection of bombs and for the automatic latching and rail launching of missiles. Reference is also made to U.S. Pat. Nos. 2,958,260; 3,273,459; 4,008,645 and 4,600,171 for their disclosure of various support and scissors or trapeze linkage mechanisms for lowering weapons from weapons bays or below aircraft for launching.

SUMMARY OF THE INVENTION

The present invention relates to a compact universal apparatus which is mountable within optimally sized weapons bays of conventional fighter aircraft and which includes an automatic scissors or trapeze type lowering linkage mechanism, a conventional or inventory bomb ejector rack unit (BRU) having automatic latching, release and forced ejection mechanisms for conventional inventory weapons, and an adaptor for the fixed attachment of the bomb ejector rack unit to the linkage of the lowering mechanism of the apparatus. The ejector rack unit is adapted to the forced ejection of large bombs, attached or latched directly thereto, and to the rail launching of missiles having launching rails attached or latched directly to the ejector rack unit. Thus, the present apparatus is capable of supporting, lowering and launching conventional inventory weapons, both large bombs, such as 2000 lb smart bombs of the GBU and JDAM types requiring forced ejection, and also rail launched missiles of the LOAL and LOBL types, with conventional automatic latch up of the bail lugs of the bombs to the launch rack lugs of the ejector rack unit, for forced ejection of the bombs, and with conventional automatic latch up of launch rails of conventional missiles for rail launching of the missiles.

THE DRAWINGS

FIG. 2 is a side view of a bomb supporting ejection apparatus according to an embodiment of the present invention, illustrated in retracted position as it appears within the weapons bay of an aircraft;

FIG. 3 is a front view of a bomb supporting ejection apparatus retracted within the weapons bay of an aircraft and also illustrated in lowered position by means of broken lines;

FIG. 4 is a side view missile rail launching apparatus according to another embodiment of the present invention, illustrated in retracted position as it appears within the weapons bay of an aircraft;

FIG. 5 is a front view of a rail launching apparatus retracted within the weapons bay of an aircraft, and also illustrated in lowered position by means of broken lines.

DETAILED DESCRIPTION

Figure 1:
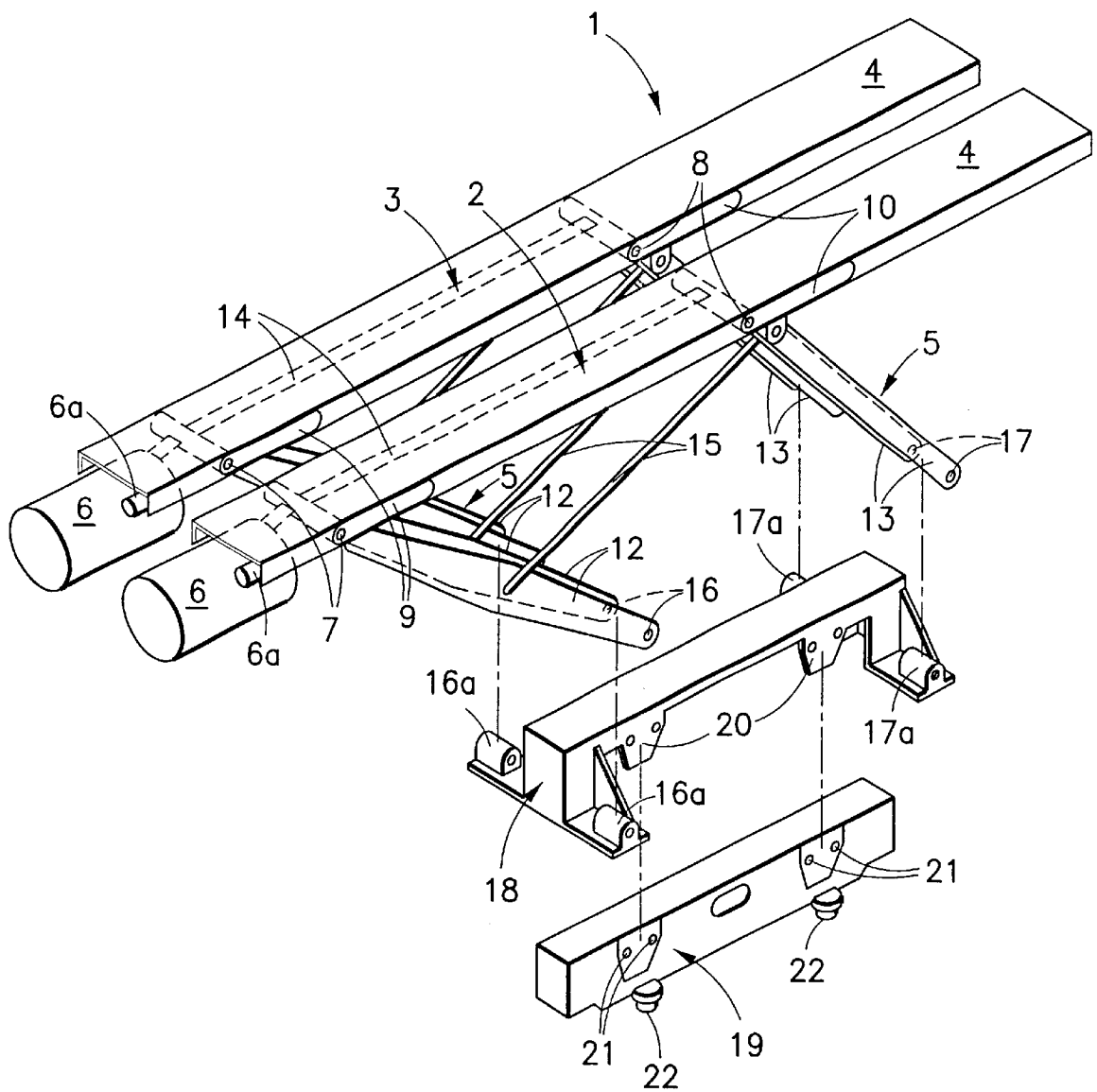
FIG. 1 is a perspective view of the components of the present apparatus, separated for purposes of illustration.

Referring to FIG. 1, the apparatus 1 thereof comprises a spaced pair of automatically deployable and retractable linkage mechanism members 2 and 3, each having an uplock housing 4 which is fastenable within the weapons bay to receive and retract the pivotably-attached trapeze-type linkage mechanism 5 upon activation of an electrical servo actuator 6 with an electrical interface 6a within each housing 4 for connection with the aircraft electrical system. The trapeze linkage mechanism 5 of each of the members 2 and 3 comprises closely spaced forward drive arms 12 and aft arms 13 and brace bars 15 therebetween. The lower areas of each of the arms 12 and 13 of each of the members 2 and 3 contain lower pivot bearings 16 and 17 for attachment to the forward and aft transversely-open bearing members 16a and 17a at one side of the ejection unit adaptor 18. Thus the adaptor 18 is supported at each side by one of the members 2 and 3, and the adaptor 18 and attached rack unit 19 are received between the members 2 and 3 when the apparatus is retracted into raised position.

The linkage mechanism 5 is attached to the uplock housing 4 by means of sliding shafts 7 and 8 the opposed ends of which are engaged within slots 9 and 10 at each side of each uplock housing 4. The upper ends of the forward arms 12 are attached to the forward shaft 7 and the upper ends of the aft arms 13 are attached to the sliding shaft 8. The shafts 7 and 8 are connected to the push rod 14 of the servo actuator 6, whereby actuation of the servo actuators 6 extends the push rods 14 and causes the shafts 7 and 8 to move rearwardly within the housing slots 9 and 10, respectively. An opposed pair of brace bars 15 are attached to the forward arms 12 and to the uplock housing 4 to provide a pivot point for the forward arms 12 when the push rods 14 are extended or retracted to move the arms 12 between lowered vertical position and raised horizontal retracted position, within the uplock housings 4.

The adaptor 18 is sized to receive and support the universal weapon ejector/launch rack unit 19 nested therewithin and fastened by means of bolts (not shown) through holes in the adaptor flanges 20 and threaded bores 21 in the rack unit 19. The rack unit 19 also carries opposed pairs of conventional forward and aft sway brace pads 22 for firm engagement with the surface of a weapon such as a bomb or launch rail attached to the ejector/launch rack unit 19 by means of attachment lugs or hooks, all as illustrated by U.S. Pat. No. 3,611,865 and as contained within or on standard universal bomb ejector racks such as the BRU-32/A Bomb Ejector Rack Unit manufactured by McDonnell Douglas Corp., Long Beach, Calif. as shown in FIG. 6.

Simultaneous energizing of the servo actuators 6 of each pair 2 and 3 of linkage members moves the forward drive arms 12 of each member to lower the trapeze linkage mechanism 5 down from its housing 4 to lower the adaptor 18 and rack unit 19 down from within the weapons bay 23 through opened bay door 24, shown in FIGS. 3 and 5, to extend the carried weapon 25 or 26, also shown in FIGS. 3 and 5, down into position for launching as illustrated by means of broken lines.

Figure 6:
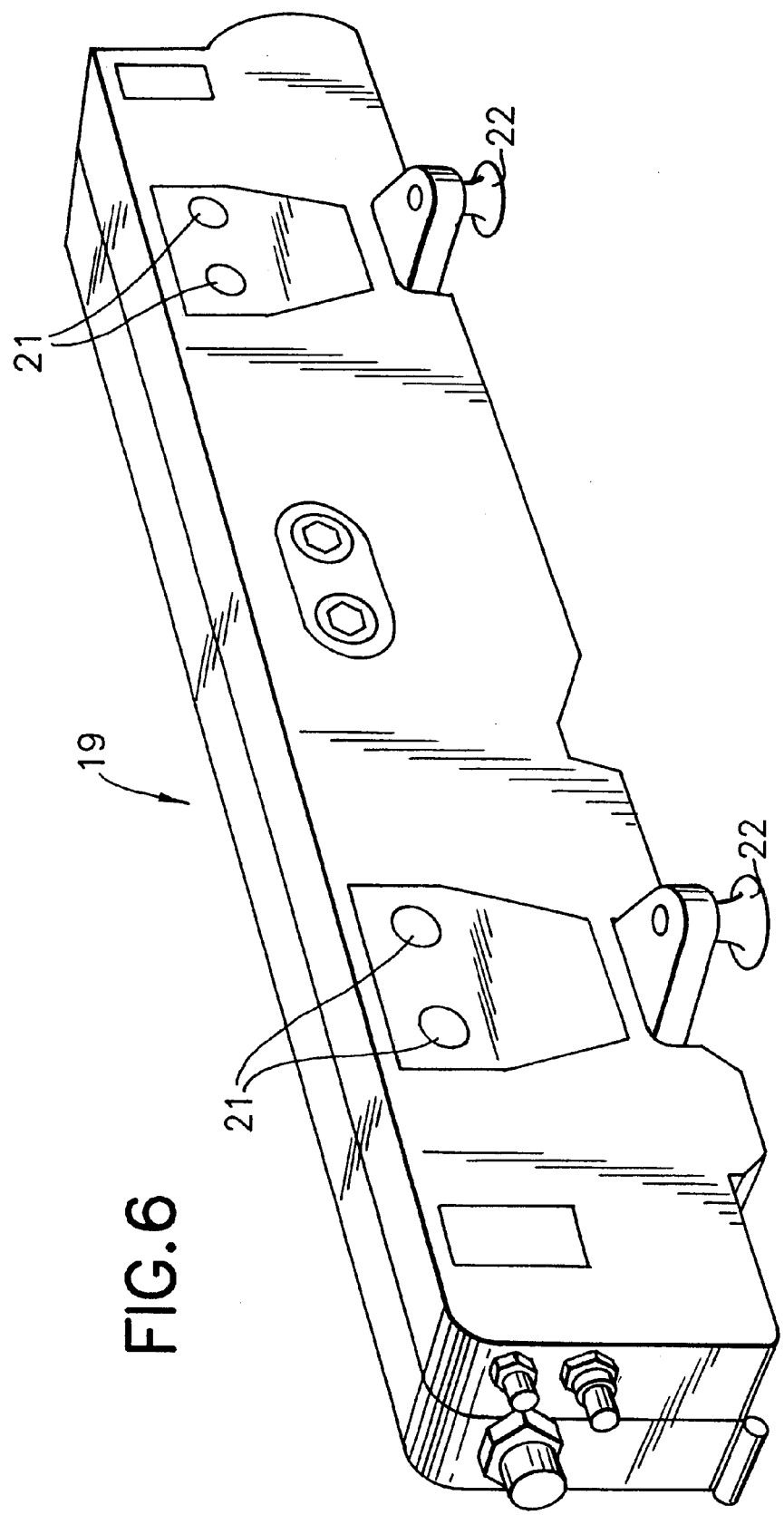
FIG. 6 is a perspective view of a weapon ejector rack of the type used in the present apparatus.

FIGS. 2 and 3 illustrate the present apparatus supporting and lowering a large bomb 25 such as a 2000 lb class GBU or JDAM smart bomb strike weapon whereby the bomb rack unit is a forced ejection unit as shown in FIG. 6. Such units are available as BRU-47 rack units which contain a forced ejector means such as a pneumatic or hydraulic ejector piston which, simultaneously with the unlatching of the bomb, forceably ejects the bomb from the ejector rack.

FIGS. 4 and 5 illustrate the present apparatus supporting and lowering a LOAL or LOBL missile 26 and launch rail 26a whereby the missile 26 is released by the rack unit 19 and simultaneously launched by the launch rail 26a.

While the linkage mechanism 5 illustrated by the present drawings is of the trapeze type, which swings the weapon forward as it is lowered into launch position, it will be apparent that the linkage mechanism can also be of the scissors type, which lowers the weapon straight down in to the launch position.

It should be understood that the above description is merely illustrative of the invention. Various alternatives and modifications can be devised by those skilled in the art without departing from this invention. Accordingly, the present invention is intended to embrace all such alternatives, modifications and variances which fall within the scope of the appended claims.

What is claimed is:

1. Compact universal apparatus for supporting, lowering and launching weapons from an aircraft weapons bay, comprising a spaced pair of automatically deployable and retractable linkage mechanism members each having a housing which is attachable within a weapons bay, and each containing an extendable and retractable linkage mechanism pair having spaced pairs of forward and aft arms, the upper portions of which are pivotably attached to said housing and the lower portions of which are pivotably attached to an adaptor means for fastening thereto a universal weapon ejector rack unit, said adaptor means comprising a housing having a lower opening for receiving the ejector rack unit for fastening therewithin, and having a spaced pair of forward and aft bearing members on each side of said housing means pivotably attached to the lower portions of the forward and aft arms of each pair of linkage mechanisms at each side of the adaptor unit housing, whereby the adaptor unit is pivotably attached at each side thereof, fore and aft, to the linkage mechanisms of one of the linkage mechanism members, and means associated with each linkage mechanism housing for simultaneously automatically activating both of the linkage mechanism members between retracted position, in which the adaptor unit and an attached ejector rack unit are positioned between the pair of linkage mechanism members, within a weapons bay, and lowered or deployed position in which the linkage mechanism arms of each of the linkage mechanism members are moved into extended position to lower the adaptor unit and an attached ejector rack unit out of and below a weapons bay into launch position for launching of a weapon latched to the ejector rack unit.

2. An apparatus according to claim 1 in which the universal ejector rack unit contains automatic latch means for inventory bail lug strike weapons.

3. An apparatus according to claim 1 in which the universal ejector rack unit contains automatic latch means for launch rails supporting rail launch missiles.

4. An apparatus according to claim 1 in which the linkage mechanism is a trapeze-type linkage mechanism.

5. An apparatus according to claim 1 in which the linkage mechanism is a scissors-type linkage mechanism.

* * * * *